United States Patent Office 3,475,448
Patented Oct. 28, 1969

3,475,448
CERTAIN SUBSTITUTED TRINITROETHYL IMIDAZOLIDINE COMPOUNDS
Godfrey Fort, Ardrossan, Scotland, assignor, by mesne assignments, to the United States of America as represented by the Secretary of the Navy
No Drawing. Filed Jan. 25, 1967, Ser. No. 612,289
Claims priority, application Great Britain, Feb. 1, 1966, 4,499/66
Int. Cl. C07d 49/34; C06b 15/02
U.S. Cl. 260—309.7         8 Claims

ABSTRACT OF THE DISCLOSURE

New imidazolidone compounds which are 4,5-dimethoxy - 1 - hydroxymethyl- and 4,5 - dimethoxy-1-methoxymethyl - 3 - (2',2', 2' - trinitroethyl)imidazolidin-2-ones and 4,5 - bis(difluoramino) - 1 - difluoroaminomethyl - 3 - (2',2',2' - trinitroethyl)imidazolidin - 2 one. The first-named compounds are prepared by reacting the corresponding non-nitro compound with nitroform in a volatile solvent and at a temperature in the range of 90 to 100° C. The fully difluoraminated compound is prepared by reacting either of the first-named compounds in a volatile solvent with difluoramine in an inert atmosphere and in the presence of concentrated sulphuric acid under conditions of difluoramine reflux. The fully difluoraminated compound is a very sensitive and powerful high explosive.

---

This invention relates to new chemical compounds which are useful energic constituents of explosive compositions, and to their preparation.

The compounds of the invention are derivatives of imidazolidin-2-one and include compounds which may be represented by the general formula:

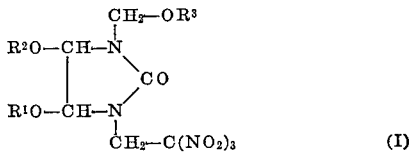

(I)

wherein $R^1$, $R^2$ and $R^3$ each represent hydrogen or alkyl groups and may be the same or different.

Also included in the new compounds of the invention are the difluoramino derivatives of the above compounds wherein some or all of the —OR groups are replaced by —NF$_2$ groups. The fully difluoraminated compound 4,5-bis(difluoramino) - 1 - difluoroaminomethyl - 3 - (2',2',2'-trinitroethyl)imidazolidin - 2 - one (Compound III below) is a very sensitive and powerful high explosive. Its heat of formation is —150 kcal./mole (estimated).

The compounds of Formula I may be prepared in accordance with the invention by reacting a compound of the general formula

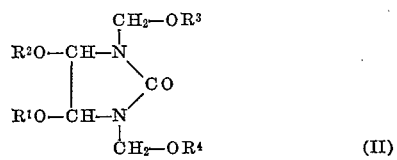

(II)

wherein $R^1$, $R^2$, $R^3$ and $R^4$, which may be the same or different, each represents hydrogen or an alkyl group, with nitroform.

The reaction may be represented as

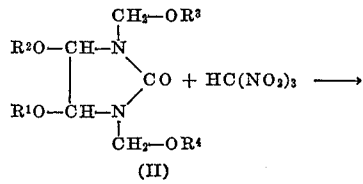

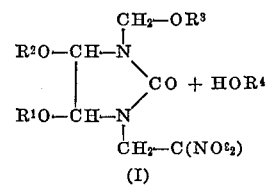

(I)

The compounds of Formula II used as starting material in the above reaction may be prepared from 4,5-dihydroxy-imidazolidin - 2 - one or 4,5 - dialkoxyimidazolidin-2-one by hydroxymethylating or alkoxymethylating these compounds in known manner.

In preparing the compounds of Formula I the reactants may advantageously be dissolved in a solvent for both reactants such as, for example, methanol and the reaction is preferably carried out at an elevated temperature, reaction temperatures of 90°–100° C. at atmospheric pressure being convenient.

Difluoraminated derivatives of the compounds of Formula I may be prepared by treating said compounds with a difluoraminating agent. The preferred difluoraminating process comprises treatment of the compounds with difluoramine in an inert atmosphere in presence of an acid catalyst. The term "inert atmosphere" is used herein to mean an atmosphhere free from any constituent, such as oxygen, which reacts with difluoramine.

The reaction for the preparation of the fully difluoraminated derivative of the compound of Formula I may be represented as

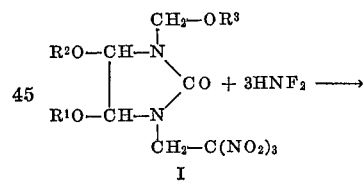

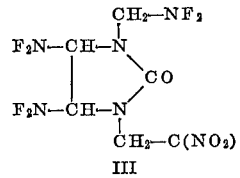

III

The preferred acid catalyst is concentrated sulphuric acid and the reaction is conveniently carried out under autogenous pressure at ambient temperature or under atmospheric pressure and lower temperatures. It is especially convenient to carry out the reaction at atmospheric pressure under conditions of difluoramine reflux at —23° C.

The use of difluoramine in excess of the stoichiometric requirement for complete difluoramination favours higher yields of Compound III.

The invention is further illustrated by the following examples in which all parts and percentages are by weight unless otherwise stated.

EXAMPLE 1

4,5 - dimethoxy - 1,3 - di(hydroxymethyl)imidazolidin-2-one, used as the starting material in this example, was prepared as a soft crystalline mass melting at 74–80° C. by reacting 4,5 - dimethoxyimidazolidin - 2 - one with paraformaldehyde according to the first stage of a method for the preparation of 1,3 - di(methoxymethyl)imidazolidin-2-one described in United Kingdom Patent No. 577,735.

2.06 parts of 4,5 - dimethoxy - 1,3 - di(hydroxymethyl) imidazolidin - 2 - one and 2.26 parts of nitroform were dissolved in 7.9 parts of methanol and the solution heated in a loosely stoppered flask at 90–100° C. on a steam-bath for 1½ hours. During heating most of the methanol boiled off. The residual methanol was removed at 30° C. and a pressure of 15 mm. and the residue dissolved in ether. The ether solution was washed in turn with water and with 5% aqueous sodium bicarbonate solution to remove unreacted nitroform, dried over sodium sulphate and evaporated at 30° C. to give 2.85 parts of a viscous oil which did not crystallise and was found to contain: C, 28.3%; H, 4.2%; N, 20.3%; $OCH_3$, 21.9%. 4,5-dimethoxy - 1 - hydroxymethyl - 3 - (2',2',2' - trinitroethyl) imidazolidin - 2 - one ($C_8H_{13}N_5O_{10}$) requires: C, 28.35%; H, 3.86%; N, 20.65%; $OCH_3$, 18.3%. The yield of unpurified products was 84% of the theoretical.

EXAMPLE 2

2.5 parts of 4,5 - dimethoxy - 1 - hydroxymethyl-3-(2',2',2' - trinitroethyl)imidazolidin - 2 - one as prepared in Example 1 were dissolved in 4 parts of methylene chloride. The solution was placed in a flask attached to a condenser cooled with solid carbon dioxide/acetone and a stream of gaseous difluoramine diluted with nitrogen was passed in until about 3.5 parts of difluoramine had condensed. 7.5 parts of 97% sulphuric acid were then added gradually, the temperature of the reaction mixture was allowed to rise to the difluoramine reflux temperature and the reaction allowed to proceed for 8–9 hours at atmospheric pressure while refluxing the difluoramine and passing a slow stream of nitrogen over the mixture. The apparatus was then allowed to come to room temperature and unreacted difluoramine vented off overnight in a slow stream of nitrogen. The residual solution was poured over 50 parts of crushed ice and the sticky product which separated was isolated by extracting three times with ether (3×16 parts). The ether extract was washed in turn with water and 1% sodium bicarbonate solution, dried over anhydrous sodium sulphate and the ether removed in a stream of nitrogen at 30° C. to give 2.8 parts of a clear syrup which gradually crystallised. After a week the sticky mass of crystals was stirred with about 6 parts of 4:1 (by volume) mixture of carbon tetrachloride and isopropanol. The crystals were filtered off, washed with the same mixture and dried in a vacuum desiccator to give 0.83 part (27% of theory) of 4,5 - bis(difluoramino) - 1 - difluoraminomethyl - 3 - (2',2',2' - trinitroethyl)imidazolidin - 2 - one as a white crystalline solid which melted at 85–86° C. and was found to contain: F, 26.3%; N, 26.9%. After recrystallisation from hot carbon tetrachloride the product melted at 87–88° C. and was found to contain: C, 17.4%; H, 1.45%; F, 27.1%; N, 26.9%. The molecular weight, determined by an ebullioscopic method in acetone, was found to be 480. 4,5 - bis(difluoramino)-1 - difluoraminomethyl-3-(2',2',2' - trinitroethyl)imidazolidin-2-one ($C_6H_6F_6N_8O_7$) requires: C, 17.3%; H, 1.45%; F, 27.4%; N, 26.9; M.W. 416.

The product dissolved readily in organic solvents such as, for example, methanol, ethanol, benzene and acetone. It burned rapidly on ignition and could be detonated by percussion. An impact sensitivity test showed that a sample of the product exploded when a ½ kg. mild steel hammer was dropped from a height of 10 cm. on to a thin layer on a mild steel anvil. There was no explosion when the height was 5 cm.

The infra-red spectrum of the product showed strong absorption bands at 5.65, 6.2, 6.3, 7.0, 7.7, 8.1, 10.8, 11.4, 11.55, 11.7, 12.3, 12.85 and 13.0$\mu$. The bands at 6.2 and 6.3$\mu$ are indicative of —$NO_2$ group and those at 11 to 12$\mu$ are indicative of $NF_2$ group.

The proton magnetic resonance spectrum of the product dissolved in deuterochloroform using tetramethylsilane as the internal reference showed 16 peaks in the region 4.03 to 5.68$\mu$. These peaks were consistent with those expected for the hydrogen nuclei, namely, in the structure of Compound III above a single peak due to those of the trinitroethyl group, a triplet due to those of the difluoraminomethyl group, and a pair of sextets due to the magnetically non-equivalent protons of the imidazolidin-2-one ring. The $^{19}F$ nuclear magnetic resonance spectrum of the product in deuterochloroform solution showed a triplet centered at 28.8 parts per million (spin-spin coupling, J=21 c./sec.), a doublet centered at 31.0 parts per million J=18 c./sec.) and a triplet centered at 43.6 parts per million J=24 c./sec.) to low field of trichlorofluoromethane internal reference. The three groups of peaks were shown by integration to be in the ratio 1:1:1 and were consistent with the spectrum of fluorine atoms combined with nitrogen in difluoramine groups attached to the 5, 4 and 1-methylene positions of the imidazolidin-2-one ring.

EXAMPLE 3

1,3 - di(methoxymethyl) - 4,5 - dimethoxyimidazolidin-2-one (B.P. 115° C./0.6 mm.), used as the starting material in this example, was prepared from 4,5 - dimethoxyimidazolidin-2-one by a method described in United Kingdom Patent 577,735 for preparing 1,3 - di(methoxymethyl)imidazolidin-2-one from imidazolidin-2-one.

1.5 parts of anhydrous zinc chloride were dissolved in 8.0 parts of methanol and 1.17 parts of 1,3-di(methoxymethyl) - 4,5 - dimethoxy-imidazolidin-2-one and 1.81 parts of nitroform were added. The resulting solution was heated on a steam bath in a loosely stoppered flask for 3 hours during which time most of the methanol boiled off. The remaining methanol was removed under vacuum at 30° C. and the liquid residue was shaken with 66 parts of a 6/5 mixture of ether and water. The ether layer was separated and washed with water and finally with 5% sodium bicarbonate solution until free from unreacted nitroform. The ether solution was dried with anhydrous sodium sulphate and evaporated to give approximately 1.25 parts (70% of theory) of crude 4,5 - dimethoxy-1 - methoxymethyl - 3 - (2',2',2' - trinitroethyl)-imidazolidin-2-one as a liquid which did not crystallise and was found to contain: C, 30.4%; H, 5.05%; N, 20.7%; $OCH_3$, 24.4%. 4,5 - dimethoxy - 1 - methoxymethyl - 3 - (2',2',2'-trinitroethyl)imidazolidin-2-one ($C_9H_{15}N_5O_{10}$) requires: C, 30.6%; H, 4.28%; N, 19.8%; $OCH_3$, 26.3%. The infra-red spectrum showed strong absorption at 5.8, 6.2–6.4, 6.9–7.0, 7.7, 8.1 and 9.0–9.3$\mu$. There was no absorption in the 3$\mu$ region indicating the absence of —NH and —OH groups.

EXAMPLE 4

3.77 parts of unpurified 4,5 - dimethoxy-1-methoxymethyl - 3 - (2'2',2' - trinitroethyl)imidazolidin - 2 - one prepared as described in Example 3 above were reacted with 30 parts of difluoramine in presence of 27 parts of methylene chloride and 75 parts of 97% sulphuric acid by the method described in Example 2, and the product isolated by extracting with ether. Evaporation of the ether extract gave 2.87 parts of crude liquid which crystallised on standing. The crystals were washed with carbon tetrachloride containing a little isopropanol to give 1.42 parts (32% of theory) of 4,5 - bis(difluoramino)-

1 - difluoraminomethyl - 3 - (2',2',2' - trinitroethyl) imidazolidin-2-one melting at 86–88.5° C. and having an infra-red spectrum similar to that of the product of Example 2.

What is claimed is:
1. A compound of the group consisting of 4,5 - dimethoxy - 1 - hydroxymethyl - 3 - (2',2',2' - trinitroethyl) imidazolidin - 2 - one, 4,5 - dimethoxy - 1 - methoxymethyl - 3 - (2',2',2' - trinitroethyl)imidazolidin - 2 - one and 4,5 - bis(difluoramino) - 1 - difluoraminomethyl-3-(2',2',2'-trinitroethyl)imidazolidin-2-one.
2. 4,5 - dimethoxy - 1 - hydroxymethyl - 3 - (2',2',2'-trinitroethyl)imidazolidin-2-one.
3. 4,5 - dimethoxy - 1 - methoxymethyl - 3 - (2',2',2'-trinitroethyl)imidazolidin-2-one.
4. 4,5 - bis(difluoramino) - 1 - difluoraminomethyl-3-(2',2',2'-trinitroethyl)imidazolidin-2-one.
5. A process for the preparation of a 3-nitro derivative of an imidazolidin-2-one which comprises reacting a compound of the formula:

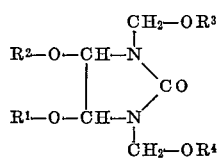

wherein $R^1$ and $R^2$ are each methyl and $R^3$ is selected from the group consisting of hydrogen and methyl, with nitroform in the presence of a volatile solvent for the reactants and at a temperature in the range of from about 90 ot 100° C.
6. A process as defined in claim 5, wherein the volatile solvent is methanol.
7. A process for the preparation of a fully difluoraminated derivative of 3 - (2',2',2' - trinitroethyl)imidazolidin-2-one which comprises reacting a member of the group consisting of 4,5 - dimethoxy - 1 - hydroxymethyl- and 4,5 - dimethoxy - 1 - methoxymethyl - 3 - (2',2',2'-trinitroethyl)imidazolidin - 2 - one in a volatile solvent with difluoramine in an inert atmosphere in the presence of concentrated sulphuric acid and under conditions of difluoramine reflux.
8. A process as defined in claim 7, wherein the volatile solvent is methylene chloride.

References Cited
UNITED STATES PATENTS
3,375,259  3/1968  Gibson et al. _____ 260—309.7

OTHER REFERENCES
Mitsch: J. Am. Chem. Soc., vol. 87, pp. 328 to 333 (1965).

LELAND A. SEBASTIAN, Primary Examiner

U.S. Cl. X.R.
149—88